United States Patent
Moerbe

(10) Patent No.: US 10,023,186 B2
(45) Date of Patent: Jul. 17, 2018

(54) TWO-WHEELED VEHICLE HAVING A DRIVE AND BRAKE POWER RESTRICTION ON THE BASIS OF SPRING TRAVEL, AS WELL AS ASSOCIATED CONTROL UNIT

(71) Applicant: Robert Bosch GmbH, Stuttgart (DE)

(72) Inventor: Matthias Moerbe, Ilsfeld-Helfebberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 64 days.

(21) Appl. No.: 15/100,763

(22) PCT Filed: Oct. 2, 2014

(86) PCT No.: PCT/EP2014/071152
§ 371 (c)(1),
(2) Date: Jun. 1, 2016

(87) PCT Pub. No.: WO2015/082095
PCT Pub. Date: Jun. 11, 2015

(65) Prior Publication Data
US 2016/0297428 A1    Oct. 13, 2016

(30) Foreign Application Priority Data
Dec. 3, 2013    (DE) .................... 10 2013 224 712

(51) Int. Cl.
*B60W 30/04*    (2006.01)
*B60T 8/17*    (2006.01)
(Continued)

(52) U.S. Cl.
CPC ........... *B60W 30/04* (2013.01); *B60T 8/1706* (2013.01); *B60W 10/04* (2013.01); *B60W 10/06* (2013.01);
(Continued)

(58) Field of Classification Search
CPC .... B60W 10/04; B60W 10/06; B60W 10/184; B60W 30/04; B60W 2030/041;
(Continued)

(56) References Cited

FOREIGN PATENT DOCUMENTS

| DE | 195 31 742 A1 | 3/1997 |
|---|---|---|
| DE | 195 32 521 A1 | 3/1997 |

(Continued)

OTHER PUBLICATIONS

International Search Report dated Nov. 27, 2015 of the corresponding International Application PCT/EP2014/071152 filed Oct. 2, 2014.

*Primary Examiner* — Joseph M Rocca
*Assistant Examiner* — Felicia L. Brittman
(74) *Attorney, Agent, or Firm* — Norton Rose Fulbright US LLP; Gerard Messina

(57) ABSTRACT

A two-wheeled vehicle having a first spring device of a front wheel and a second spring device of a rear wheel, and at least one acceleration and rate-of-rotation sensor, which are situated on a vehicle frame and are operationally connected to a control device, wherein the first and the second spring devices are provided with a spring travel sensor in each case, which are operationally connected to the control device.

6 Claims, 2 Drawing Sheets

(51) Int. Cl.
*B60W 10/06* (2006.01)
*B60W 10/184* (2012.01)
*B60W 10/04* (2006.01)
*B60W 50/00* (2006.01)

(52) U.S. Cl.
CPC ........ *B60W 10/184* (2013.01); *B60T 2230/03* (2013.01); *B60T 2240/06* (2013.01); *B60W 2030/041* (2013.01); *B60W 2050/0087* (2013.01); *B60W 2510/22* (2013.01); *B60W 2520/16* (2013.01); *B60W 2710/00* (2013.01); *B60W 2710/0666* (2013.01); *B60W 2710/18* (2013.01); *B60W 2710/182* (2013.01); *B60W 2720/30* (2013.01); *B60Y 2200/12* (2013.01)

(58) Field of Classification Search
CPC ..... B60W 2050/0087; B60W 2510/22; B60W 2520/16; B60W 2710/00; B60W 2710/0666; B60W 2710/18; B60W 2710/182; B60W 2710/30; B60T 8/1706; B60T 2230/06; B60T 2240/06; B60Y 2200/12
USPC ........................................................ 280/283
See application file for complete search history.

(56) References Cited

FOREIGN PATENT DOCUMENTS

| | | | |
|---|---|---|---|
| DE | 10 2005 018 484 A1 | 10/2006 | |
| DE | 10 2006 027 608 A1 | 12/2007 | |
| EP | 0 524 821 A2 | 1/1993 | |
| EP | 0524821 A2 * | 1/1993 | ......... B60G 17/0195 |
| EP | 0 537 724 A2 | 4/1993 | |
| WO | WO 2007/020271 A1 | 2/2007 | |

\* cited by examiner

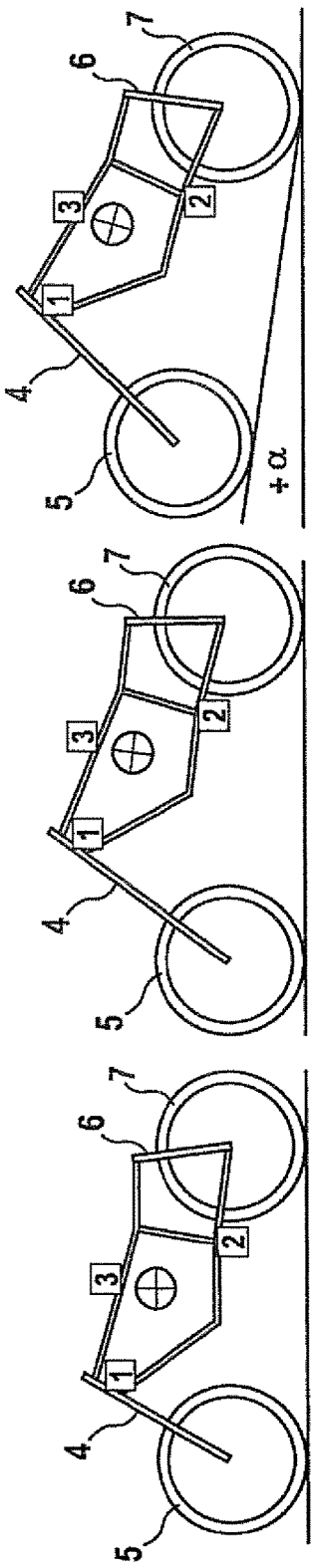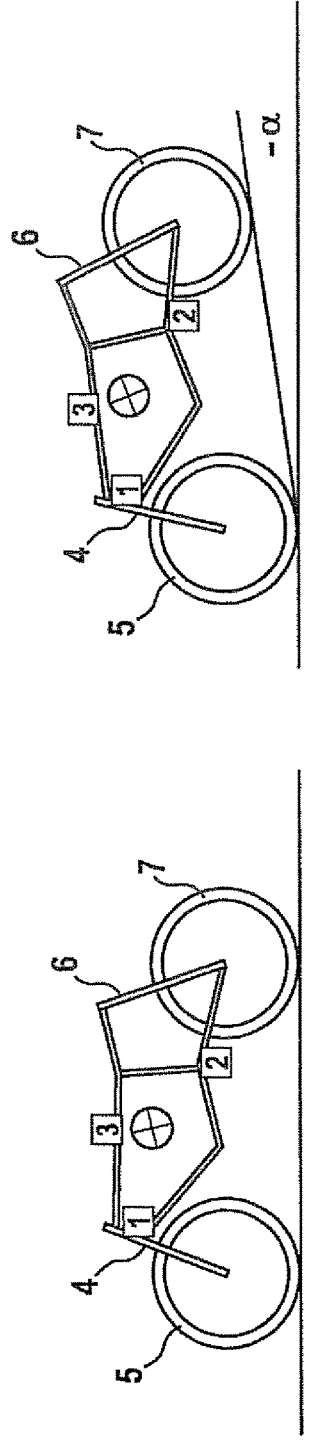

TWO-WHEELED VEHICLE HAVING A DRIVE AND BRAKE POWER RESTRICTION ON THE BASIS OF SPRING TRAVEL, AS WELL AS ASSOCIATED CONTROL UNIT

BACKGROUND INFORMATION

In the case of two-wheeled vehicles, especially electric bicycles equipped with ABS brake control systems, a brake force restriction prevents the vehicles from flipping over in the forward direction in response to excessive brake forces and torques and pulses resulting from such. Pressure sensors, which detect a critical driving state, are frequently used for this purpose. In addition, there are systems known from the related art which use acceleration sensors and rate-of-rotation sensors for preventing a forward flip-over.

Such sensors are also used for restricting a backward flipover caused by an excessive drive force that is inappropriate for the particular driving situation, so that the drive power and, in particular, the drive torque are controlled in a suitable manner.

SUMMARY

The present invention relates to a two-wheeled vehicle having a first spring device of a front wheel and a second spring device of a rear wheel as well as at least one acceleration and rate-of-rotation sensor, the sensors being situated on a vehicle frame and operationally connected to a control device. According to the present invention, the first and second spring devices are equipped with a spring travel sensor, which in turn is operationally connected to the control device.

The present invention offers the opportunity of taking the road gradient or traffic lane gradient into account in addition to the data from the acceleration and rate-of-rotation sensor. In the present invention, spring travel sensors allocated to the front wheel and the rear wheel generate spring travel information toward this end, which is utilized in the control. As long as the front wheel and the rear wheel are in contact with the pavement or the road, a stable driving state results for the two-wheeled vehicle. Only when one of the wheels lifts off from the pavement in a braking or an acceleration operation may this possibly lead to an undesired flipover in the forward or backward direction. Therefore, the spring travel is ascertained with the aid of the spring travel sensors according to the invention. Except in cases where the individual maximum values of the spring travel are exceeded will there be the risk of lost contact between the front wheel or the rear wheels loses and the road. This state is monitored and prevented by the control according to the present invention.

The spring travel sensors preferably are developed as travel sensors or angular position sensors. In one preferred further development, a spring deflection or spring compression of the front fork is able to be ascertained with the aid of a laser sensor. In the same way, the present invention may be used for determining the particular spring travel that is encountered in the second spring devices for the rear wheel, the angular-position sensor being utilized for this purpose.

It is understood that the acceleration and rate-of-rotation sensor provided according to the present invention may be developed as one component or as separate components.

According to the present invention, the values of the spring travel sensors on the front wheel or the rear wheel are therefore used in addition to the values of the acceleration sensor and/or the rate-of-rotation sensor for a semi-active wheel suspension control. The signals from the spring travel sensors are thus also utilized for controlling a drive torque at the rear wheel and/or for controlling a brake force at the front wheel, so that an optimal acceleration or deceleration can be ensured regardless of the road condition. Since the drive forces or the brake forces depend considerably on whether the vehicle is driving uphill or downhill, and the loading of the vehicle also may vary greatly due to shifts in the driver and/passenger positions, the information provided according to the present invention about the individual spring travels and, in particular, a complete utilization of the spring travels constitutes a reliable auxiliary variable for the system control.

The control unit of the present invention for use in a two-wheeled vehicle, which includes a first spring device of a front wheel and a second spring device of a rear wheel as well as at least one acceleration and rate-of-rotation sensor disposed on a vehicle frame, is therefore designed in such a way that the control unit activates a drive torque control on the rear wheel only when the maximum spring travel at the front wheel (maximum rebound at the front wheel) has been reached, so that a backward flipover can be avoided. To avoid a flipover toward the front, the control of the present invention activates a brake force control on the front wheel only when the maximum spring travel at the rear wheel has been reached (maximum rebound of the second spring device on the rear wheel).

In one especially advantageous development of the present invention, an online calibration takes place at a position of the two-wheeled vehicle in which it is located on a horizontal roadway and the acceleration and rate-of-rotation sensor therefore outputs an angle of essentially zero in relation to the earth's gravitational field.

Within the scope of the control according to the present invention, the control unit ascertains the individually available spring travel of the spring device of the front wheel and the spring device of the rear wheel on the basis of the online calibration. The individual total spring travels of the vehicle preferably may be specified on the basis of the system or design. It is preferred here if the particular maximum spring travel that forms the basis of the control is less than the possible spring travel provided by the design in order to prevent undesired lift-off of the particular wheel, so that sufficient lateral guidance forces and sufficient longitudinal stability can be ensured. In this context it is also advantageous if the brake force control and/or the drive torque control take(s) place as a function of the coefficient of friction of the front wheel or the rear wheel on the roadway.

BRIEF DESCRIPTION OF THE DRAWINGS

Exemplary embodiments of the present invention are described below in detail below with reference to the figures.

FIG. 2 shows a schematic representation of a neutral driving state.

FIG. 3 shows an illustration of a driving state featuring maximum rebound of the first spring device on the front wheel, without the front wheel lifting off.

FIG. 4 shows an illustration of a driving state in uphill driving at maximum acceleration with a front wheel that is lifting off.

FIG. 5 shows an illustration of a driving state featuring maximum deceleration and maximum spring travel of the rear wheel without the rear wheel lifting off.

FIG. 6 shows an illustration of an operating state, analogous to FIG. 5, in downhill driving at maximum deceleration and maximum spring travel of the rear wheel with the rear wheel lifting off.

DETAILED DESCRIPTION OF EXAMPLE EMBODIMENTS

Figure 1:
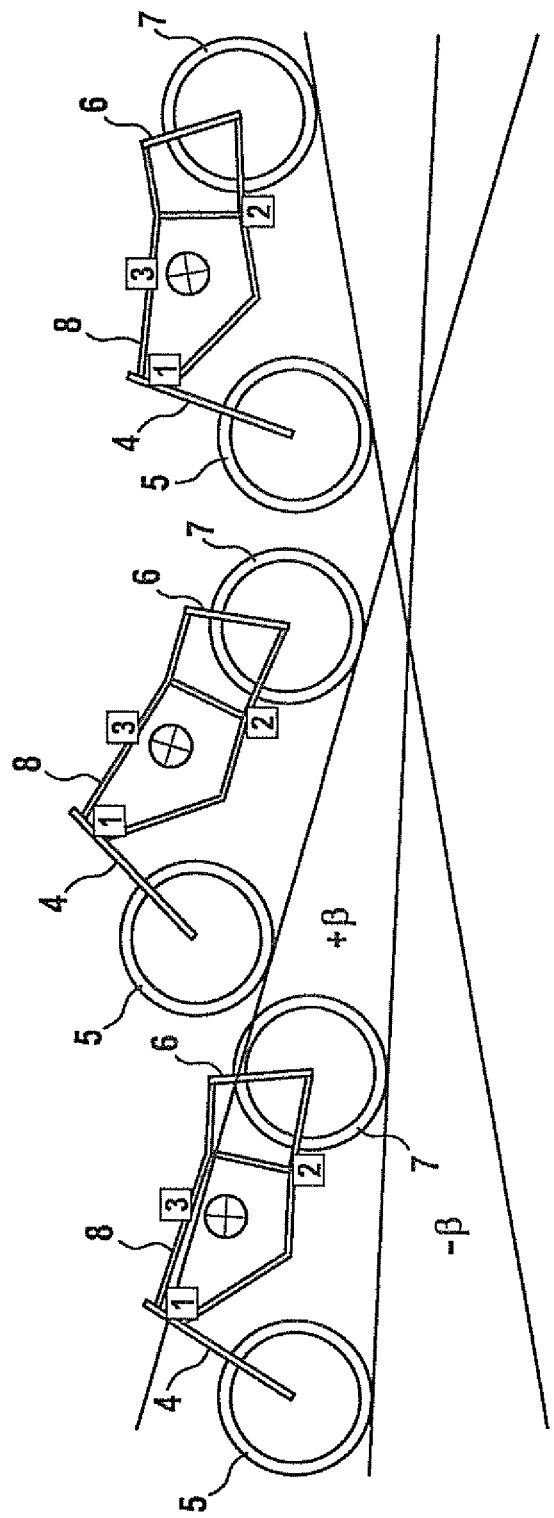
FIG. 1 shows a schematic illustration of the driving states of a two-wheeled vehicle during normal driving, uphill driving and during downhill driving.

FIG. 1 shows three possible driving states of a two-wheeled vehicle. It includes a vehicle frame 8 on which a front wheel 5 and a rear wheel 7 are mounted. Front wheel 5 is supported with the aid of a first spring device 4, such as a suspension fork, and rear wheel 7 is mounted on the frame with the aid of a second spring device 6, which may be developed in the form of a rocker arm. An acceleration and rate-of-rotation sensor 3 is situated on vehicle frame 8. First spring device 4 is provided with a spring travel sensor 1, while a spring travel sensor 2 is disposed on second spring device 6.

FIG. 1 shows three possible driving states of a two-wheeled vehicle, i.e., in one plane (left illustration), when driving uphill (center illustration) and when driving downhill (right illustration). The individual angles of inclination for uphill and downhill driving have been designated by ß, the algebraic sign denoting the corresponding roadway gradient.

Spring travel sensors 1 and 2 sense the rebound and compression at front wheel 5 (spring travel sensor 1) as well as the angular position or the spring travel at rear wheel 7 (spring travel sensor 2). By shifting the gravitational center of the overall system, depending on the size and algebraic sign of angle ß, the spring travel is influenced, as well. In the extreme case, the vehicle would flip over in a forward or backward direction when the center of gravity is shifted beyond the tire contact patch of front wheel 5 or rear wheel 7.

FIGS. 2 through 6 show a schematic representation of the transition from the neutral driving position in the plane shown in FIG. 2 to the driving states featuring maximum acceleration and maximum deceleration.

At high accelerations, starting from the illustration according to FIG. 2, first the compression travel at front wheel 5 is depleted by the static load, before front wheel 5 lifts off from the roadway at an angle $\alpha$. This process is illustrated in FIGS. 2 through 4. The central acceleration and rate-of-rotation sensor 3 is unable to distinguish whether the rebounding of first spring device 4 on front wheel 5 and the lift-off of front wheel 5 is the result of a roadway inclination or an occurring load torque. For this reason, the spring travel is measured at the front wheel with the aid of spring travel sensor 1 according to the present invention. If the values output by spring travel sensor 1 provide the information that a further adaptation by an attainment of the maximum spring travel or by an attainment of a final stop of first spring device 4 is no longer possible, then this means that the measured angle of acceleration and rate-of-rotation sensor 3 is subject to the portion of the roadway inclination of $\alpha$. In such an operating state, front wheel 5 is no longer in contact with the pavement. To prevent front wheel 5 from lifting off and a backward flip-over, the control according to the present invention induces a control of the drive torque at rear wheel 7.

The spring travel of the first spring device preferably is measured with the aid of a laser.

In an analogous manner, the control according to the present invention takes place in a transition from the neutral driving position according to FIG. 2 to the operating states illustrated in FIGS. 5 and 6. When braking, a spring deflection of first spring device 4 takes place initially. Second spring device 6 on rear wheel 7 will rebound up to a maximum value in the process, which is detected by spring travel sensor 2 on the rear wheel. In the operating state shown in FIG. 6 (in particular in uphill travel), rear wheel 7 will therefore lift off. In order to avoid this process and a possibly imminent forward flipover, a brake force control takes place according to the present invention.

The spring travel at the rear wheel preferably is measured with the aid of an angular position sensor.

Since the downgrade forces are incremented or decremented when accelerating or braking, the travel information of spring sensors 1 and 2 is a measure of the restriction of the drive force and the braking force. Because the geometrical conditions and loads differ in individual two-wheeled vehicles, in particular because of mechanical changes of the spring systems/damping systems, and they also vary under the particular operating conditions (only one driver or an additional passenger and/or additional luggage), an online calibration is especially advantageous for ascertaining the neutral position according to the present invention. This takes place in a neutral driving position, in which acceleration and rate-of-rotation sensor 3 shows an angle near zero in relation to the earth's gravitational field and no speed or acceleration of the two-wheeled vehicle exists. On the basis of such a state, spring travel sensors 1 and 2 are able to precisely determine the available spring travels of first spring device 4 and second spring device 6.

To avoid a backward flipover (operating states of FIGS. 2, 3 and 4), the drive forces preferably are regulated in such a way according to the present invention that either a residual spring travel of the spring devices remains or a defined angle $\alpha$ is permitted by acceleration and rate-of-rotation sensor 3 at the instant when the maximum residual spring travel has been reached. This angle $\alpha$ may be variable as a function of the coefficient of friction, in order to be able to take the roadway condition into account. Especially filtering of the ascertained values of $\alpha$ is advantageous in this context.

During a braking operation (FIGS. 2, 5 and 6), the deceleration of the vehicle for a brake control in an ABS operation according to the present invention is to be selected such that rear wheel 7 stays on the ground at all times and a defined angle $\alpha$ is permitted as a function of the coefficient of friction. For variable $\alpha$, the control is determined with the aid of sensor 3. The control is preferably developed in such a way that the limits of the lateral guidance forces at front wheel 5 do not drop below a minimum measure.

The present invention can be used in all two-wheeled vehicles equipped with spring systems and a controllable drive as well as a regular brake.

What is claimed is:

1. A control unit for use on a two-wheeled vehicle, the two-wheeled vehicle including a first spring device of a front wheel, a second spring device of a rear wheel, and at least one acceleration and rate-of-rotation sensor, which are situated on a vehicle frame, wherein the two-wheeled vehicle has a first and a second spring sensor, which are situated on the first and on the second spring devices, respectively, wherein the control unit is designed to at least one of:
   i) activate a drive torque control at the rear wheel only when a maximum spring travel at the front wheel has been reached, and
   ii) activate a brake force control at the front wheel only when a maximum spring travel at the rear wheel has been reached;

wherein the control unit is further designed to perform an online calibration for determining the available spring travels when the two-wheeled vehicle is in a position in which the acceleration and rate-of-rotation sensor outputs an angle of essentially zero in relation to the direction of the earth's gravitational force.

2. The control unit as recited in claim 1, wherein at least one of the brake force control and the drive torque control is carried out as a function of a coefficient of friction of at least one of the front wheel and the rear wheel.

3. The control unit as recited in claim 1, wherein at least one of the brake force control and the drive torque control is carried out as a function of limits of lateral guidance forces of at least one of the front wheel and the rear wheel.

4. A two-wheeled vehicle having a first spring device of a front wheel, a second spring device of a rear wheel, and at least one acceleration and rate-of-rotation sensor, which are situated on a vehicle frame, operationally connected to a control unit, the first and the second spring devices respectively provided with a spring travel sensor, which are operationally connected to the control device, the control device designed so that at least one of: i) a drive torque control at the rear wheel is activated only when a maximum spring travel at the front wheel has been reached, and ii) a brake force control at the front wheel is activated only when a maximum spring travel at the rear wheel has been reached, wherein an online calibration for determining the available spring travels takes place in a position in which the acceleration and rate-of-rotation sensor outputs an angle of essentially zero in relation to the direction of the earth's gravitational force.

5. The two-wheeled vehicle as recited in claim 4, wherein at least one of the brake force control and the drive torque control is carried out as a function of a coefficient of friction of at least one of the front wheel and the rear wheel.

6. The two-wheeled vehicle as recited in claim 4, wherein at least one of the brake force control and the drive torque control is carried out as a function of limits of lateral guidance forces of at least one of the front wheel and the rear wheel.

* * * * *